United States Patent [19]
Filmer et al.

[11] Patent Number: 5,612,263
[45] Date of Patent: Mar. 18, 1997

[54] GLASS COMPOSITION FOR A LAMP ENVELOPE OF A BLACK LIGHT BLUE LAMP

[75] Inventors: Bartholomeus Filmer; Henderikus De Vroome, both of Eindhoven, Netherlands

[73] Assignee: U.S. Philips Corporation, New York, N.Y.

[21] Appl. No.: 587,187

[22] Filed: Jan. 16, 1996

[30] Foreign Application Priority Data

Jan. 13, 1995 [EP] European Pat. Off. .............. 95200069

[51] Int. Cl.⁶ ............................................... C03C 3/087
[52] U.S. Cl. ........................................ 501/71; 313/480
[58] Field of Search ............................ 501/71; 313/480

[56] References Cited

U.S. PATENT DOCUMENTS 3,513,003  5/1970  Hammer et al. .......................... 501/71

FOREIGN PATENT DOCUMENTS 6-56471   3/1994  Japan .
7-118034  5/1995  Japan .
1721031A1 3/1992  U.S.S.R. ......................... C03C 3/095

*Primary Examiner*—Karl Group
*Attorney, Agent, or Firm*—Walter M. Egbert, III

[57] ABSTRACT

A novel type of leadless, black glass for use in an envelope (3) of a black light blue lamp (1) which includes CoO in an amount of 0.45 to 1.0 wt % and NiO in an amount of 2.8 to 3.4 wt %. The glass does not comprise PbO and $B_2O_3$. The glass can be exchanged with the existing lead-containing glasses for such envelopes (3). A burning lamp (1) having such an envelope (3) emits light of the same intensity and colour as the existing lamp and emits predominantly UV-A radiation.

6 Claims, 2 Drawing Sheets

GLASS COMPOSITION FOR A LAMP ENVELOPE OF A BLACK LIGHT BLUE LAMP

The invention relates to a glass composition for use in a black light blue lamp.

The invention also relates to a glass lamp envelope for a black light blue lamp.

The invention further relates to a black light blue fluorescent lamp having a glass lamp envelope made from such a glass composition.

Black light blue lamps emit predominantly UV-A radiation (wavelength 315–380 nm) and a slightly visible violet-blue light. Such lamps contain mercury vapour in which, during operation of the lamp, a discharge is generated which is accompanied by the emission of characteristic mercury spectral lines such as, inter alia, spectral lines having the desired wavelength of 365 nm. The inner wall of the lamp envelope is provided with a fluorescent powder which absorbs short-wave UV-B and UV-C radiation and, subsequently, emits said radiation predominantly in the form of long-wave UV-A radiation.

A black light blue lamp is used to cause certain materials to fluoresce by means of UV-A radiation; this is referred to as photoluminescence. Photoluminescence is most clearly visible when the environment is dark. This is the reason why the lamp should emit as little visible light as possible. This is achieved by making the glass of the lamp envelope absorb the greater part of the emitted visible light. If the lamp is in the off-state, the glass of the lamp envelope is black. The glass does allow passage of UV-A radiation and of some violet and blue light, so that the burning lamp is of a violet-blue colour. The lamp must not emit harmful UV-B (wavelength 280–315 nm) and UV-C (wavelength 100–280 nm) radiation; this radiation is almost completely absorbed by the fluorescent powder on the inner wall of the lamp envelope.

Such lamps are used, inter alia, for examining minerals, gems, stamps etc, and to detect falsifications such as forged money, cheques, documents and paintings. The lamps are also used to diagnose and treat skin diseases and to illuminate dance floors (disco lamps).

The glass of the existing black light blue lamps comprises lead with a content of approximately 20 wt. % PbO. PbO improves the processability and leads to an increase of the electrical resistance of the glass.

A disadvantage of the use of PbO is its toxicity. In the preparation of lead glass, PbO is released into the atmosphere by atomization and evaporation, which has a harmful effect on the environment and on the operators. Also when lead glass is subjected to a heat treatment, such as during "bridge-making", shaping and fusing, PbO is released. Consequently, the working environment has to be adapted drastically to avoid exposure to PbO. Another disadvantage of PbO is the high price of the raw material. Yet another disadvantage of PbO is the reduction of the light output in compact fluorescent lamps, which is caused by evaporation and, subsequently, condensation of PbO on the fluorescent powder when the lead-containing tube glass is subjected to a hot working operation. This is the reason why a type of glass for a lamp envelope, which is free of lead and yet has the desired physical properties as regards meltability, softening, expansion and transmission has been sought for a good length of time.

Russian Patent Application SU-A- 1721031 discloses a leadless glass for use in black light blue lamps. The glass compositions described, which have a high transmission at 365 nm, comprise 2 to 4 wt. % $B_2O_3$.

A disadvantage of the use of $B_2O_3$ is the high price of this raw material and its aggressiveness relative to the refractory material of the glass furnace. Other disadvantages of the well-known leadless glasses are the high BaO content (6 to 8 wt. %) and the high NiO content (7 to 9 wt. %), the raw materials of which are expensive. Due to the high BaO content, the crystallization tendency of the glasses also increases substantially. Said well-known leadless glasses are also doped with an antimony-containing component as the refining agent. However, this substance is toxic and remains in the glass predominantly as $Sb_2O_3$.

It is an object of the invention to provide, inter alia, a glass composition for a lamp envelope of a black light blue fluorescent lamp, which glass composition is leadless and, in addition, does not have the above-mentioned disadvantages, while the transmission of UV and visible radiation is equal to that of the well-known lead-containing glass composition.

The invention further aims at providing a lamp envelope having such a glass composition, which transmits UV-A radiation (predominantly at a wavelength of 365 nm) at least equally well as the existing lamp envelope.

A still further object of the invention is to provide a black light blue fluorescent lamp which, in the on-state, is of the same colour as the existing lamp, so that said existing lamp and the lamp in accordance with the invention can be exchanged unnoticeably.

The object of providing a UV-light transmitting, leadless, black glass for an envelope of a fluorescent lamp is achieved in accordance with the invention by a glass composition which, expressed as a percentage by weight, is composed of the following constituents:

| | |
|---|---|
| $SiO_2$ | 65–75 |
| $Al_2O_3$ | 1–3 |
| $Na_2O$ | 14–18 |
| $K_2O$ | 0.5–5 |
| MgO | 2–5 |
| CaO | 3–6 |
| CoO | 0.45–1.0 |
| NiO | 2.8–3.4 |
| $Fe_2O_3$ | 0–0.2 |
| rest | 0–0.3. |

This glass composition does not comprise the above-mentioned, adverse components PbO, $B_2O_3$, BaO and $Sb_2O_3$. Said glass comprises up to 0.3 wt. % of possible impurities, $TiO_2$ and/or residues of the refining agent used. The glass exhibits a high transmission of UV-A radiation and hence can be exchanged with the existing glass. The glass is very suitable for the manufacture of lamp envelopes of black light blue lamps.

The $SiO_2$ content of the glass in accordance with the invention is limited to 65–75 wt. %. In combination with the other constituents, said $SiO_2$ content leads to a readily fusible glass. $SiO_2$ serves as a network former. If the $SiO_2$ content is below 65 wt. %, the cohesion of the glass and the chemical resistance are reduced. If the $SiO_2$ content is above 75 wt. %, the glass forming operation is hampered and the risk of surface crystallization increases.

$Al_2O_3$ improves the chemical resistance and the resistance against decay of the glass. Below 1 wt. %, the effect is too small and the crystallization tendency of the glass increases. Above 3 wt. %, the viscosity and the softening temperature ($T_{soft}$) of the glass increase excessively, which adversely affects the processability of the glass.

The alkali metal oxides $Na_2O$ and $K_2O$ are used as a fluxing agent and ead to a reduction of the viscosity of the glass. Below the indicated limits, $T_{soft}$ increases too much and above said limits, the electrical resistance decreases excessively. The alkali metal oxides are also used to adapt the coefficient of expansion ($\alpha$) of the glass to that of the glass of the exhaust tube necessary for evacuation.

The alkaline earth metal oxides MgO and CaO have the favourable properties that they improve the chemical resistance of the glass and reduce the melting temperature ($T_{melt}$). Below the indicated limits, decay and $T_{melt}$ increase too much. Above the indicated limits, $T_{soft}$ and the crystallization tendency increase too much.

CoO and NiO are added to the glass to absorb the visible light. CoO absorbs green to red light (500–700 nm) and NiO absorbs blue to green light (400–550 nm). Both components have the advantage that they absorb little UV-A radiation around 365 nm. However, both components are very expensive and hence are added in the lowest possible concentrations. Too low a concentration of each component leads to too high a transmission in the visible wavelength range, as a result of which the colour of a burning lamp having an envelope of this glass will deviate from that of the existing lamp.

An NiO content above the indicated limit leads to too low a transmission at a wavelength of 404.7 nm (one of the Hg spectral lines), so that a burning lamp having an envelope of this glass will be of a colour which differs from that of an existing lamp. In addition, above the indicated limit, the UV-A absorption increases too much.

A CoO content above the indicated limit leads to a different colour of the lamp, i.e. the lamp becomes darker and bluer in colour. In addition, the infrared transmission of the glass will decrease, as a result of which shaping of the glass becomes more difficult. A higher concentration of CoO also leads to a higher UV-A absorption. The glass may also comprise 0.2 wt. % $Fe_2O_3$. $Fe_2O_3$ has a favourable influence on the absorption of harmful UV-B and UV-C radiation.

The leadless glass composition in accordance with the invention can be refined with $Na_2SO_4$, so that the glass may contain up to 0.2 wt. % $SO_3$. As a result, the use of toxic antimony compounds is avoided.

The glass in accordance with the invention preferably has the following composition, expressed as a percentage by weight, to avoid visual colour differences between burning black light blue lamps having envelopes of this glass:

| | |
|---|---|
| $SiO_2$ | 67.8–68.8 |
| $Al_2O_3$ | 1.6–1.8 |
| $Na_2O$ | 16.7–17.3 |
| $K_2O$ | 1.0–1.2 |
| MgO | 3.2–3.6 |
| CaO | 4.5–4.9 |
| CoO | 0.52–0.58 |
| NiO | 2.9–3.1 |
| $Fe_2O_3$ | 0.05–0.09 |
| rest | 0–0.3. |

As the glass composition in accordance with the invention exhibits a high transmission of UV-A radiation and a high absorption of visible light, it can very suitably be used to manufacture glass envelopes for black light blue lamps. These envelopes often are tubular with an outside diameter between 9 and 30 min. The inner wall of the envelope is provided with a fluorescent powder, for example strontium tetraborate activated with divalent europium. By virtue of the absence of PbO in the glass, evaporation and condensation of PbO on the fluorescent powder do not occur during shaping of the tube glass at an increased temperature, so that the light output of the lamp is not reduced.

In operation, a black light blue fluorescent lamp having an envelope of a glass composition in accordance with the invention is of the same colour as the existing black light blue lamps having envelopes of PbO-containing glasses. In addition, the output of UVA radiation is at least equal to that of the existing lamps.

These and other aspects of the invention will be apparent from and elucidated with reference to the embodiments described hereinafter.

EXEMPLARY EMBODIMENT

A glass composition comprising the following quantities of raw materials is melted:

| | |
|---|---|
| quartz flour | 1242.9 g |
| potassium feldspar | 182.3 g |
| soda | 575.0 g |
| dolomite | 308.5 g |
| cobalt oxide | 11.9 g |
| nickel oxide | 60.6 g |
| iron oxide | 0.9 g |
| sodium sulphate | 10.0 g + |
| total | 2392.1 g |

The glass is melted in a platinum crucible in a gas-heated laboratory furnace at 1450° C. Sodium sulphate is used as a refining agent. Said mixture yields 2.0 kg of glass. During melting and further processing, no particular problems occur. The molten glass is used to east plates and blow bulbs.

The composition of the glass obtained in accordance with the invention and the physical properties thereof are listed in Table 1. For comparison, this Table also gives an existing lead-containing glass composition of a black light blue lamp.

TABLE 1

| | Composition in % by weight | |
|---|---|---|
| Constituents | leadless glass in accordance with the invention | existing lead-containing glass |
| $SiO_2$ | 68.3 | 60.7 |
| $Al_2O_3$ | 1.7 | 1.3 |
| $Na_2O3$ | 17.0 | 9.4 |
| $K_2O$ | 1.1 | 5.5 |
| MgO | 3.3 | — |
| CaO | 4.7 | — |
| PbO | — | 19.4 |
| CoO | 0.55 | 0.2 |
| NiO | 0.07 | 3.0 |
| $Fe_2O_3$ | — | 0.07 |
| $Sb_2O_3$ | 0.3 | 0.3 |
| rest | | 0.1 |

TABLE 1-continued

| | Composition in % by weight | |
|---|---|---|
| Constituents | leadless glass in accordance with the invention | existing lead-containing glass |
| $10^6 \cdot \alpha_{25-300}$ | 10.3 | 10.0 |
| $T_{strain}$ (°C.) | 480 | 410 |
| $T_{ann}$ (°C.) | 520 | 440 |
| $T_{soft}$ (°C.) | 680 | 615 |
| $T_{work}$ (°C.) | 975 | 950 |
| $T_{melt}$ (°C.) | 1400 | 1415 |
| $T_{k100}$ (°C.) | 175 | 260 |
| $T_g$ (°C.) | 510 | 430 |
| log (rho)$_{250}$ | 6.5 | 8.2 |
| log (rho)$_{350}$ | 5.1 | 6.4 |
| s.m. (kg/m$^3$) | 2530 | 2880 |

The symbols in this Table have the following meaning:

$\alpha_{25-300}$: average coefficient of expansion between 25° C. and 300° C.

$T_{strain}$ (*C): temperature at which $\eta$ (viscosity)=$10^{14,5}$ dPa.s, termed strain point.

$T_{ann}$ (*C): temperature at which $\eta=10^{13,0}$ dPa.s, termed annealing point.

$T_{soft}$ (*C): temperature at which $\eta=10^{7,6}$ dPa.s, termed softening point.

$T_{work}$ (*C): temperature at which $\eta=10^{4,0}$ dPa.s, termed working temperature.

$T_{melt}$ (*C): temperature at which $\eta=10^{2,0}$ dPa.s, termed melting point.

rho (ohm.cm): specific resistance.

$T_{k100}$ (*C): temperature at which rho=$10^8$ ohm.cm.

$T_g$ (*C): transformation temperature.

log(rho)$_{250}$: logarithm to the base 10 of rho at 250° C.

log(rho)$_{350}$: logarithm to the base 10 of rho at 350° C.

s.m. (kg/m$^3$): specific mass.

The transmission of the glass (including reflection losses at the surface) in the range between 200 and 800 nm is measured on a double-sided, polished glass plate having a thickness of 0.85 min. This thickness corresponds to the wail thickness of an envelope of an existing black light blue lamp.

Figure 1:
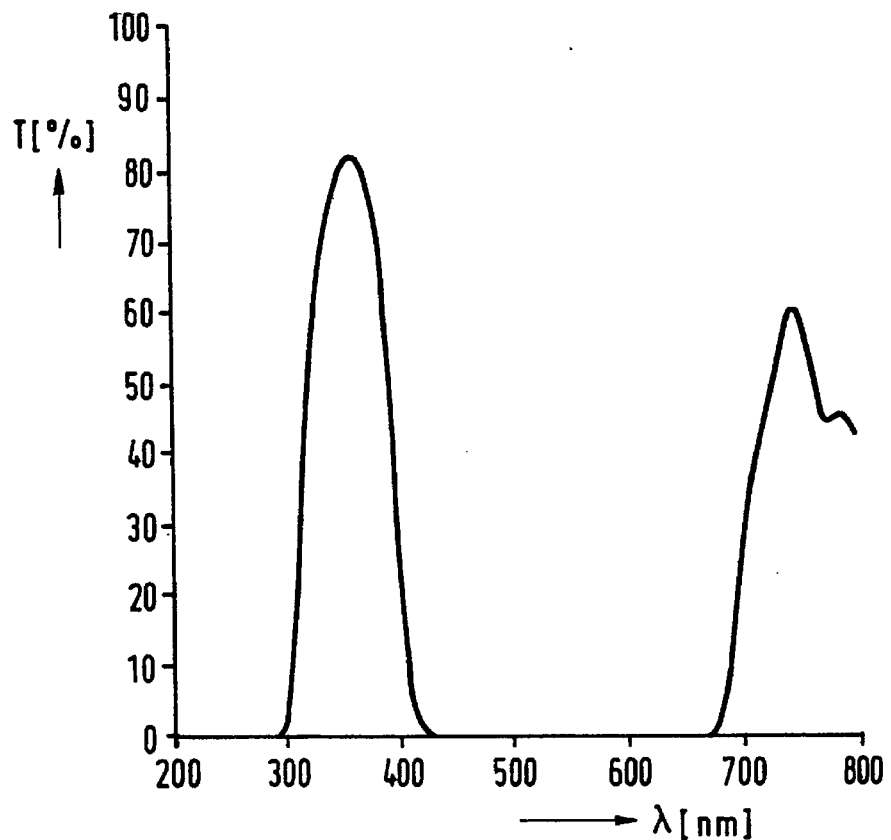
FIG. 1 shows the curve of the transmission T (in %) as a function of the wavelength $\lambda$ (in nm) of a glass having a thickness of 0.85 mm and a composition in accordance with the invention.
Figure 2:
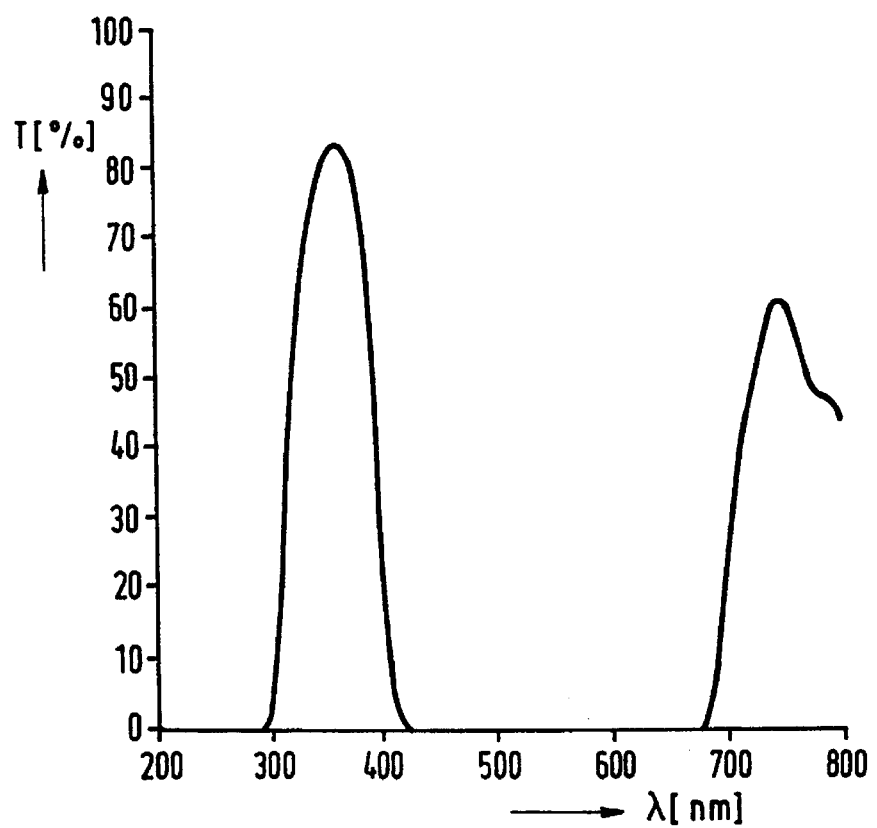
FIG. 2 shows the curve of the transmission T (in %) as a function of the wavelength $\lambda$ (in nm) of an existing glass for a black light blue lamp having a glass thickness of 0.85 mm.

FIG. 1 shows the curve of the transmission T (in %) as a function of the wavelength λ (in nm) of the leadless glass in accordance with the invention. FIG. 2 shows the same relation for existing, lead-containing glass for envelopes of black light blue lamps. Both curves are substantially identical in shape. The leadless glass composition in accordance with the invention (Table 1, column 2) has physical properties which are comparable to those of an existing lead-containing glass (Table 1, column 3) and hence said leadless glass composition can suitably replace the existing lead-containing glass composition for an envelope of a black light blue lamp.

Table 2 shows the transmission values of the leadless glass in accordance with the invention and of the existing lead-containing glass at a number of important wavelengths.

The wavelength of 280 nm and the mercury lines 296.7; 302.2 and 312.6 nm fall within the UV-B radiation range. Radiation having a wavelength of 290 nm and longer is passed partly by the glass. However, this radiation is absorbed completely by the fluorescent powder on the inner wall of the lamp envelope.

The wavelength of 365 nm, which falls within the UV-A radiation range, is one of the mercury lines and it is also the wavelength at which the customarily used fluorescent powder exhibits maximum emission. At this wavelength, the transmission of the glass should be maximal.

The transmissions at the mercury line 404.7 nm and at wavelengths of 410 and 430 nm are important because said mercury line and wavelengths constitute the transition point where UV-A radiation is passed and visible light absorbed. For black light blue lamps this transition should be as sharp as possible, i.e. the lamp must emit little visible light and much UV-A.

The transmissions at wavelengths of 510 and 560 nm are important because, in this wavelength range, the sensitivity of the eyes is maximal and the absorption coefficients of, respectively, NiO and CoO are minimal. At these wavelengths, a reduction of the NiO and/or CoO content(s) can most clearly be observed in the form of a transmission increase.

TABLE 2

| | Transmission (%) | |
|---|---|---|
| Wavelength (nm) | leadless glass in accordance with the invention | existing lead-containing glass |
| 280 | 0.0 | 0.0 |
| 296,7 | 3.6 | 0.8 |
| 302,2 | 9.6 | 4.8 |
| 312,6 | 30.7 | 25.4 |
| 365 | 84.2 | 81.8 |
| 404,7 | 12.8 | 19.6 |
| 410 | 5.2 | 8.6 |
| 430 | 0.1 | 0.1 |
| 510 | 0.0 | 0.0 |
| 560 | 0.1 | 0.0 |

Table 3 shows the influence of the CoO and NiO contents in glasses 1–7 on the transmission of visible light at different wavelengths. The concentrations of the other components, with the exception of SiO$_2$, are kept constant. All transmissions are measured at a glass thickness of 0.85 mm. Glasses 1–3 are leadless glasses in accordance with the invention. Glass 1 corresponds to that of Tables 1 and 2. Glasses 4–7 are leadless glasses, not in accordance with the invention, in which only the CoO and/or NiO content(s) is (are) varied. Glasses 4–7 exhibit too high a transmission at wavelengths of 410; 430; 510 and 560 nm. At least 0.45 wt. % CoO is required for a sufficiently low transmission in the visible wavelength range. For the same reason, also a minimum quantity of NiO is required. The other components in the glass, such as Na$_2$O, do not influence the transmission of visible light.

TABLE 3

| | Composition in wt. % | | | | | | |
|---|---|---|---|---|---|---|---|
| Component | 1 | 2 | 3 | 4 | 5 | 6 | 7 |
| CoO | 0.55 | 0.45 | 0.45 | 0.25 | 0.3 | 0.35 | 0.4 |
| NiO | 3.0 | 3.0 | 3.3 | 2.5 | 2.5 | 3.0 | 2.5 |
| wavelength (nm) | Transmission in % | | | | | | |
| 404.7 | 12.8 | 14.1 | 10.2 | 19.8 | 19.3 | 14.0 | 19.2 |
| 410.0 | 5.2 | 6.0 | 3.7 | 9.6 | 9.3 | 5.9 | 9.2 |
| 430.0 | 0.1 | 0.1 | 0.1 | 0.3 | 0.4 | 0.1 | 0.4 |
| 510.0 | 0.0 | 0.1 | 0.0 | 0.5 | 0.5 | 0.2 | 0.3 |
| 560.0 | 0.1 | 0.2 | 0.1 | 1.0 | 0.8 | 0.3 | 0.4 |

Figure 3:
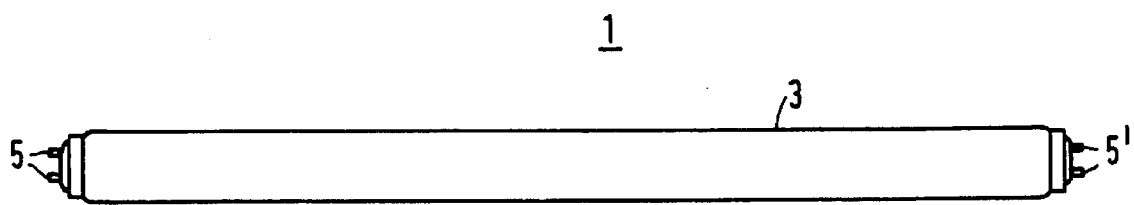
FIG. 3 shows a black light blue lamp.

The leadless glass in accordance with the invention is drawn into a tubular shape with an outer diameter of 16 mm by means of a method which is known per se. The tube thus formed is provided on the inside with an $SrB_4O_7$:Eu fluorescent powder and treated further to form a black light blue fluorescent lamp. FIG. 3 schematically shows a black light blue lamp 1 comprising a tubular envelope 3 of a glass having a composition in accordance with the invention. The lamp is provided at both ends with contact pins 5 and 5' to connect the lamp to the mains.

Figure 4:
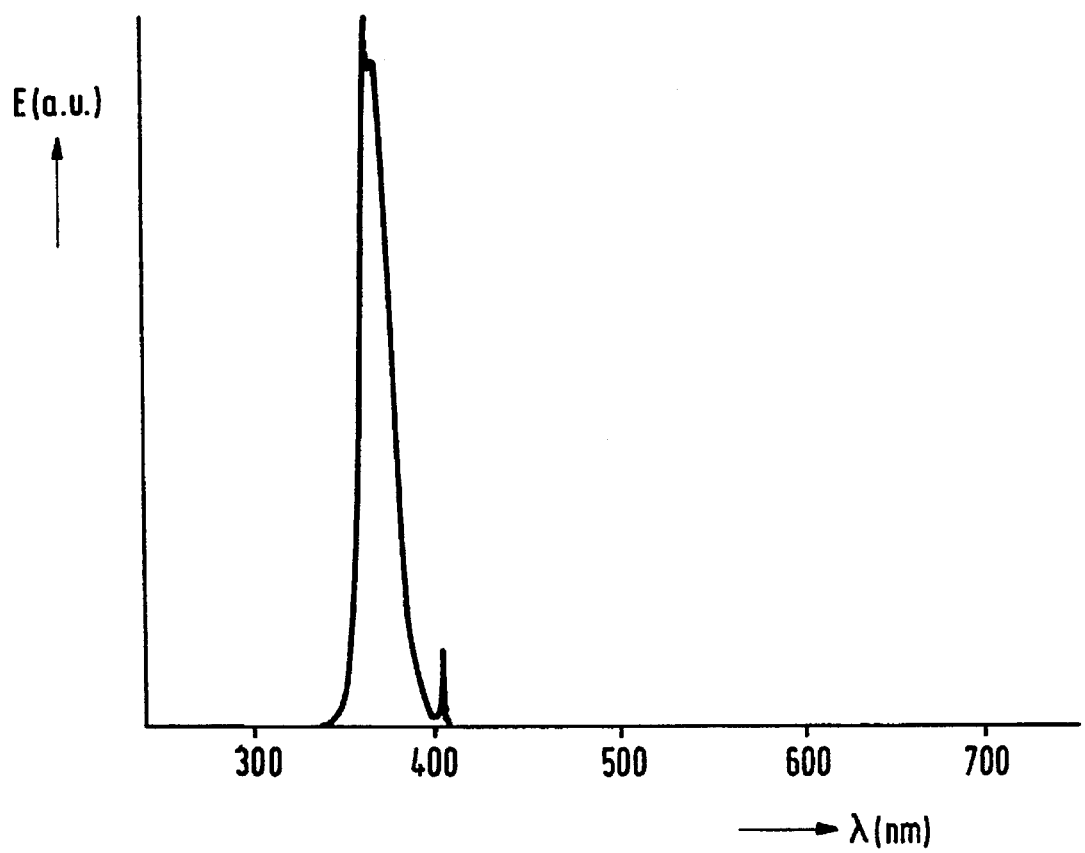
FIG. 4 shows the relative emission spectrum of a black light blue lamp having an envelope of a glass composition in accordance with the invention.

FIG. 4 shows the relative emission spectrum of such a burning lamp. In this Figure, the emission E is plotted in arbitrary units (a.u.) on the y axis and the wavelength $\lambda$ (in nm) is plotted on the x axis. Said Figure clearly shows that the lamp emits almost exclusively UV-A radiation with a maximum at $\lambda=365$ nm. The emission spectrum corresponds to that of an existing black light blue lamp having a lead-containing glass envelope.

A glass of a composition in accordance with the invention is free of lead, does not comprise $B_2O_3$ and is very suitable for use as an envelope of a black light blue lamp. In operation, such a lamp is of the same blue-violet colour as an existing lamp having an envelope of lead-containing glass. To this end, the CoO and NiO contents fall within narrow limits, in particular the nominal CoO content deviates substantially from that of the known lead-containing glasses.

We claim:

1. A leadless, black glass which allows passage of UV-light for an envelope of a fluorescent lamp, said glass being composed, expressed as a percentage by weight, of the following constituents:

| | |
|---|---|
| $SiO_2$ | 65–75 |
| $Al_2O_3$ | 1–3 |
| $Na_2O$ | 14–18 |
| $K_2O$ | 0.5–5 |
| MgO | 2–5 |
| CaO | 3–6 |
| CoO | 0.45–1.0 |
| NiO | 2.8–3.4 |
| $Fe_2O_3$ | 0–0.2 |
| rest | 0–0.3. |

2. A glass as claimed in claim 1 having the following composition:

| | |
|---|---|
| $SiO_2$ | 67.8–68.8 |
| $Al_2O_3$ | 1.6–1.8 |
| $Na_2O$ | 16.7–17.3 |
| $K_2O$ | 1.0–1.2 |
| MgO | 3.2–3.6 |
| CaO | 4.5–4.9 |
| CoO | 0.52–0.58 |
| NiO | 2.9–3.1 |
| $Fe_2O_3$ | 0.05–0.09 |
| rest | 0–0.3. |

3. A lamp envelope having a glass composition as claimed in claim 2.

4. A fluorescent lamp having a lamp envelope with a composition as claimed in claim 2.

5. A fluorescent lamp having a lamp envelope with a composition as claimed in claim 1.

6. A lamp envelope having a glass composition as claimed in claim 1.

* * * * *